H. F. MARANVILLE.
APPARATUS FOR PLACING WASHERS IN RUBBER HEEL MOLDS.
APPLICATION FILED JAN. 18, 1919.

1,429,359.

Patented Sept. 19, 1922.

Patented Sept. 19, 1922.

1,429,359

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

APPARATUS FOR PLACING WASHERS IN RUBBER-HEEL MOLDS.

Application filed January 18, 1919. Serial No. 271,878.

*To all whom it may concern:*

Be it known that I, HARVEY F. MARANVILLE, a citizen of the United States, residing at Akron, in the county of Summit, State of Ohio, have invented certain new and useful Improvements in Apparatus for Placing Washers in Rubber-Heel Molds, of which the following is a specification.

Rubber heels as universally manufactured at the present time have embedded therein series of small metal washers provided with a central opening through which the heel securing nails are driven into the shoe. These washers are generally cupped or dished slightly, the concave side of the washer being faced toward the ground side of the heel so that the nail may be guided into the hole in the center of the washer if it is driven slightly out of the perpendicular.

Rubber heel molds are usually made in gangs of any suitable number, the lowermost plate of the mold being provided with a series of upstanding pins or studs which form the nail holes in the finished heel and on which the washers are supported. As the heel molds are laid out in regular rows, the several studs fall into a series of lines across the mold.

It has been the practice heretofore to place the small washers on the pins by hand and it is one of the objects of my invention to devise a machine which will quickly and accurately place the washers on the pins in the molds.

The machine which I have devised will assemble the washers convex side up in a chute or passage way and deposit one washer on each pin in a mold as it is passed through the machine. This will be done quickly and automatically and it presents many advantages over the tedious hand operation now in general use.

The washers as they are received from the manufacturer frequently have burrs or fins on their edges and it is one of the objects of my invention, and as an important element thereof, to provide means for removing the burrs and bringing the washers to proper size and condition so that they can be handled in the machine.

Other purposes and objects will be apparent as the description proceeds, it being understood that I am not limited in any manner to the details of construction or operation shown, but am entitled to all fair equivalents in the protection afforded by my application.

The apparatus herein shown comprises several parts and the specification may be conveniently divided into subheads as a means of describing the machine; the main supporting frame on which the mold plates may be received and which is provided with means for passing the plate through the machine; a sizing and burr removing and smoothing device; a series of hoppers and mechanism for insuring the passage of the washers convex side up, assembling them in the chutes from which they pass on to the pins in the molds. There is also shown, and will be described, the chutes or runways for the washers. These devices are capable of separate use as hand tools and they form the subject matter of a copending application filed January 18, 1919, Serial No. 271,879.

*Supporting frame and mold carrier.*

The main supporting frame of the machine comprises a number of standards, one of which is shown at 1, and uprights or brackets 2, on one of which is supported a motor 3. The upper faces of the brackets are inclined at an angle and support a table or face plate 4 on which are supported the various hoppers and washer manipulating devices. From the forward portion of the brackets 2 extend supporting rails 5 which support such additional rows of distributing hoppers as may be found necessary. Between the brackets 2 is carried a table or platform 6, which supports rails 7 on which are carried cars 8 by means of flanged rollers 9, the cars supporting the mold plates 10.

The mold plates 10 are loaded on the cars and pass through the machine receiving the washers from the several chutes.

Figure 3:
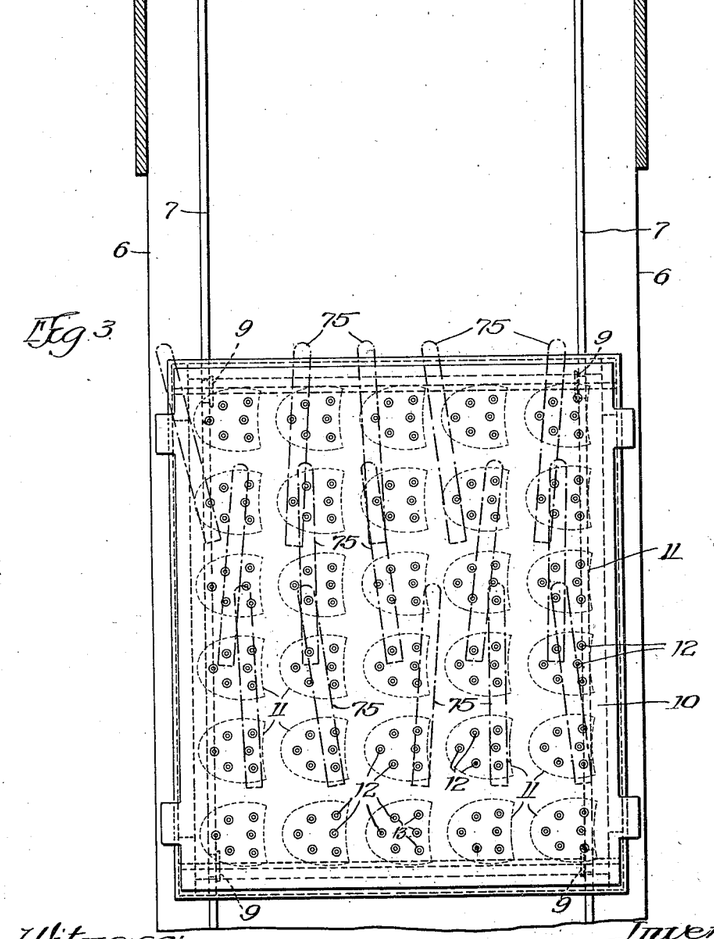
Fig. 3 is a plan view of a mold showing the manner in which the various chutes may be adjusted to operate on a mold.

A mold plate is shown in Fig. 3 in which 11 represents the outline of the mold surface which forms the lower surface of the molding cavity. In each mold outline is arranged a number of pins or studs 12 near the upper ends of which are formed shoulders 13 on which the washers 14 are supported. As has been mentioned heretofore, the washers are concave and are supported on the pins concave face downward.

The showing of the mold in Fig. 3 is representative of an average mold but the number and size of the mold cavities are subject to change and the machine is designed to apply washers to any mold or arrangement of cavities by adjustment of the feeding chutes as will be explained later.

*Burr removing apparatus.*

Figures 1, 11, 12, 13, 14:
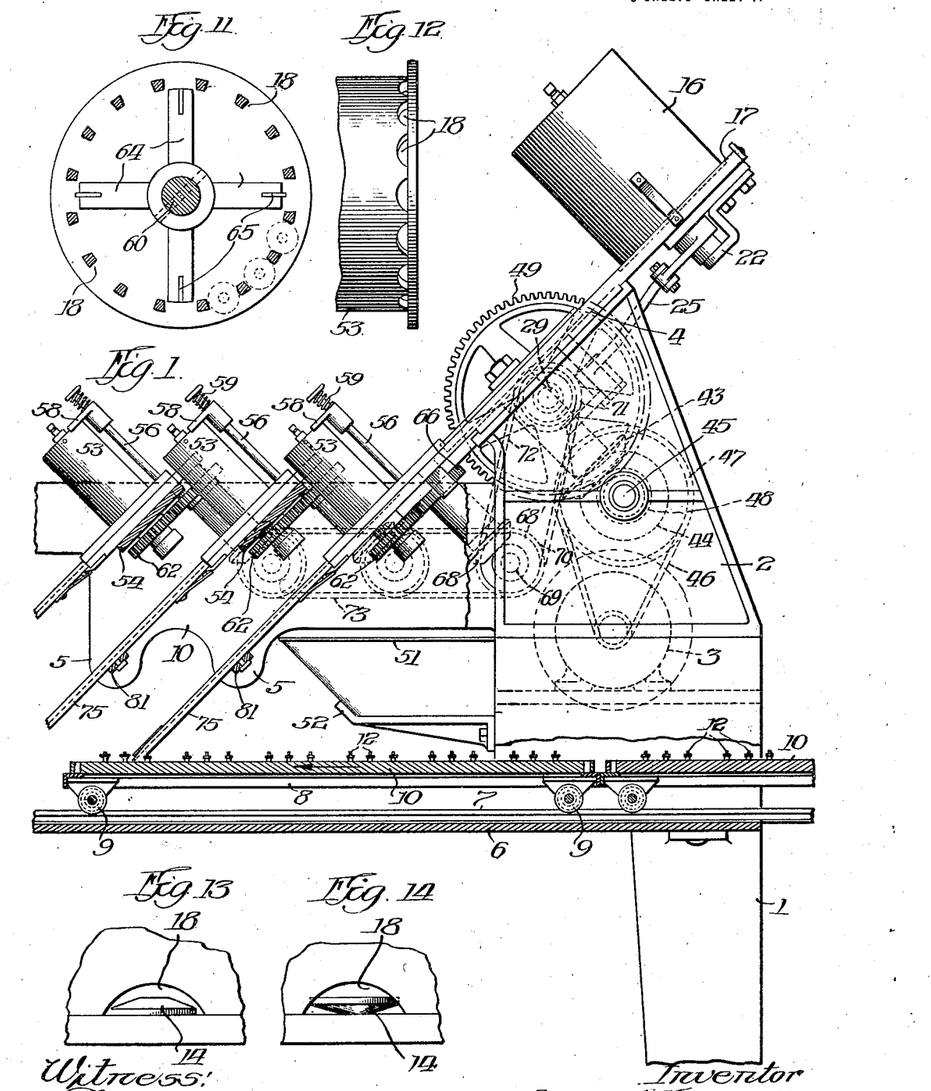
Fig. 1 is a side elevation of the machine showing a mold passing through it.
Fig. 11 is a cross section through the lower part of one of the distributing hoppers.
Fig. 12 is a side elevation of the lower part of the hopper.
Figs. 13 and 14 are details showing the manner in which the passage of the washer from the hopper convex side up is obtained.
Figure 2:
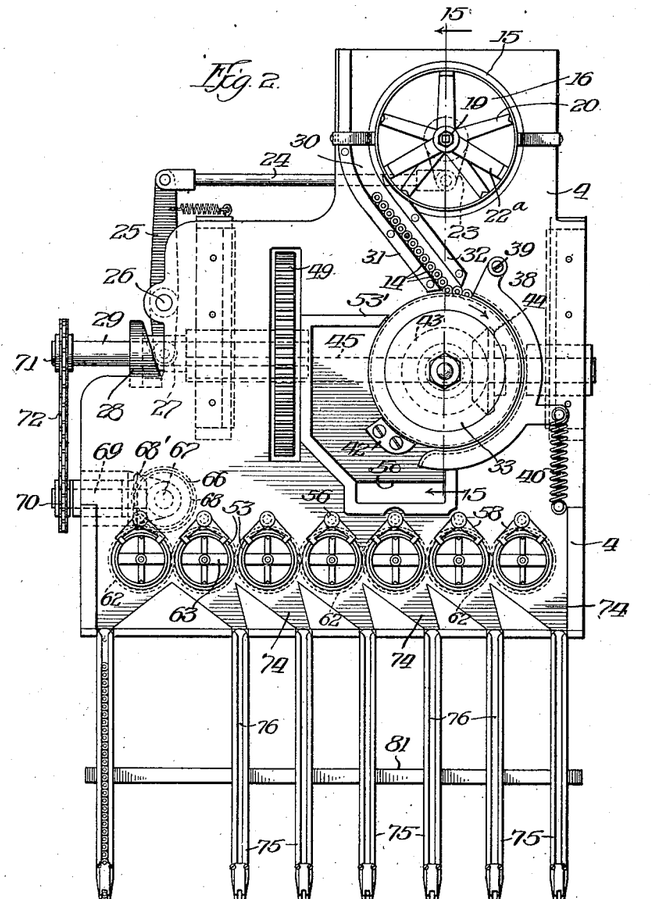
Fig. 2 is a plan view, all but the first set of washer guides or chutes being removed for the sake of clearness.
Figure 15:
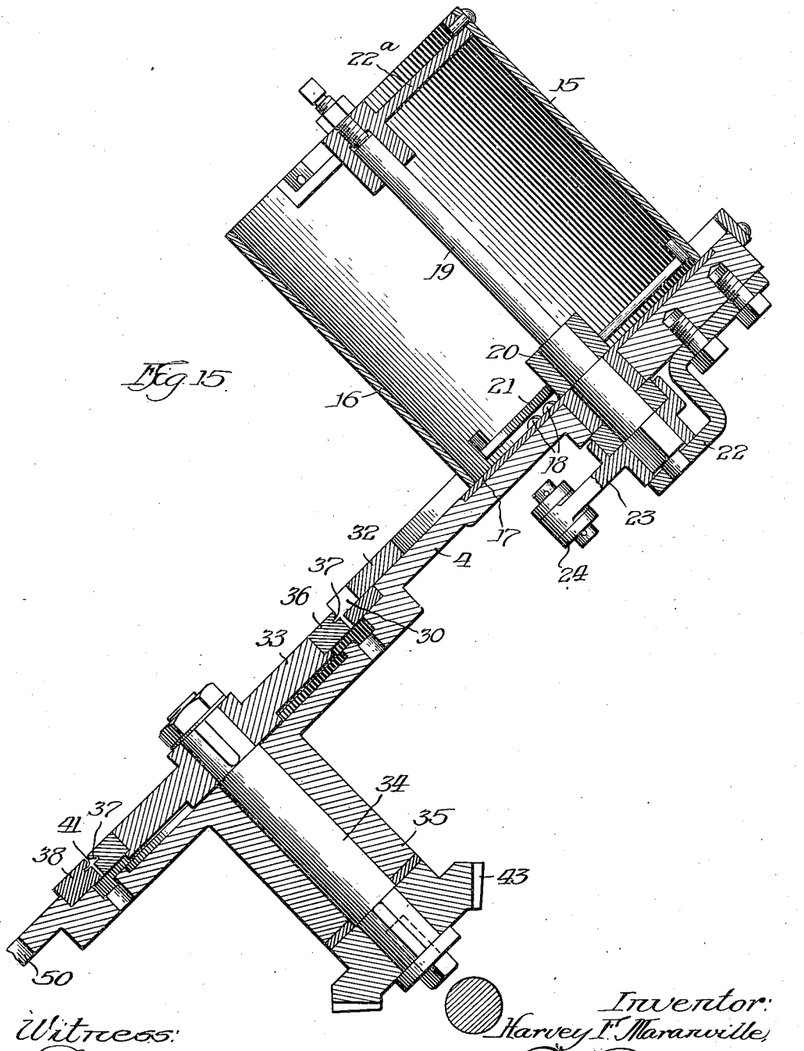
Fig. 15 is a vertical section on the line 15—15 of Fig. 2 through the main hopper and sizing and deburring apparatus.

The washers as manufactured are frequently formed with burrs or rough edges which make them difficult to handle in a machine, and one feature of the invention is a device for removing the burrs and putting the washers in condition to be handled by the machine. This device is shown in Figs. 1, 2 and 15.

On the upper part of the face plate 4 is carried a hopper or bin 15, in which are placed the washers as received from the manufacturer. The hopper comprises a cylinder 16 resting on a plate 17. On one side of the cylinder is located a series of holes or apertures similar to those in the distributing hoppers, as will be described. These may be of any desired form but I have found that the form best suited to my purpose is shown in Figs. 13 and 14. These are arched or segment shaped holes 18, the shape and size of the holes being such that the washers 14 will pass through the holes with the concave face downward but will not pass through with the concave face upward. An inspection of Figs. 13 and 14 will make this clear.

Inside of the hopper is supported a vertical shaft 19 which carries any suitable form of agitator or stirrer 20. The form of agitator will admit of numerous modifications. I have shown a series of radial blades 21 which are oscillated over the face of the plate 17. The lower end of the shaft 19 extends downwardly through the face plate and is received in a bearing 22 secured to the under side of the plate, the upper end of the shaft being mounted in a spider 22ª on the top of the hopper 15. From the lower end of the shaft extends a crank arm 23 which is connected by a link 24 with a rocking lever 25 pivoted to the face plate at 26. The other end of the lever carries a roller 27 which contacts with a cam 28 secured to a horizontal shaft 29 supported in the frame work.

As the agitator 20 is oscillated in the bottom of the hopper, the washers pass out through the holes 18 and into a runway 30 formed by side rails 31 and 32 secured to the face plate 4. The lower end of this runway delivers the washers to a deburring and sizing wheel 33. The wheel comprises a central disk mounted on a rotating shaft 34, received in a bearing 35 extending rearwardly from the face plate. Around the periphery of the wheel or disk is secured a hardened steel rim 36, the edge of which is formed with a groove 37 into which one side of a washer is received and by which it is carried around until deburred. Surrounding one side of the wheel is a complementary stationary grinding member or shoe 38 in somewhat the form of a crescent, pivoted at 39 to the face plate and held against the row of descending washers by a spring 40. This sizing or grinding shoe is also formed of hardened steel and has on its inner face a complementary groove 41 facing the groove 37. The shoe terminates near the lower part of the grinding wheel and near it is secured a pointed washer removing plate 42 which extends into the path of the washers and removes such as do not freely drop out of the groove 37. It will be seen that the washers are received in the wheel 33 and carried around to the discharge point, being rotated and ground on the way.

The lower end of the shaft 34 carries a bevel pinion 43 in mesh with a bevel pinion 44 carried on a shaft 45 supported in bearings in the brackets 2. A chain 46 connects the shaft of the motor 3 with a sprocket 47 on the shaft 45. A pinion 48, also secured to the shaft 45, meshes with a gear 49 on the shaft 29 to drive the agitators.

The wheel 33 is rotated in the direction of the arrow in Fig. 2 and the washers are passed between the two burr removing and grinding elements and pass out the lower side and through a hole 50 in the face plate into a pan 51, which is supported on brackets 52 extending from the frame. A wall 53' surrounds the hole 50 and the discharge side of the de-burring apparatus preventing escape of the washers. As the washers pass into the pan 51, they are of uniform size and smoothness and are in condition to be handled by the distributing and washer placing devices. While it may be possible to perfect the manufacture of the washers to such an extent that burr removing and sizing will not be necessary, as washers are now commercially manufactured an arrangement of this nature or its equivalent is necessary.

*Distributing hopper and chutes.*

Near the lower edge of the face plate 4 are supported a plurality of distributing hoppers 53 of any suitable number into which washers are placed from the pan 51. Additional rows of hoppers may be added to the front of the machine, such hoppers being supported on cross bars 54 extending between the side plates 5 parallel to the face plate. As all of the hoppers are similar in construction, one only will be described.

Figures 4, 5, 6, 7, 8, 9, 10:
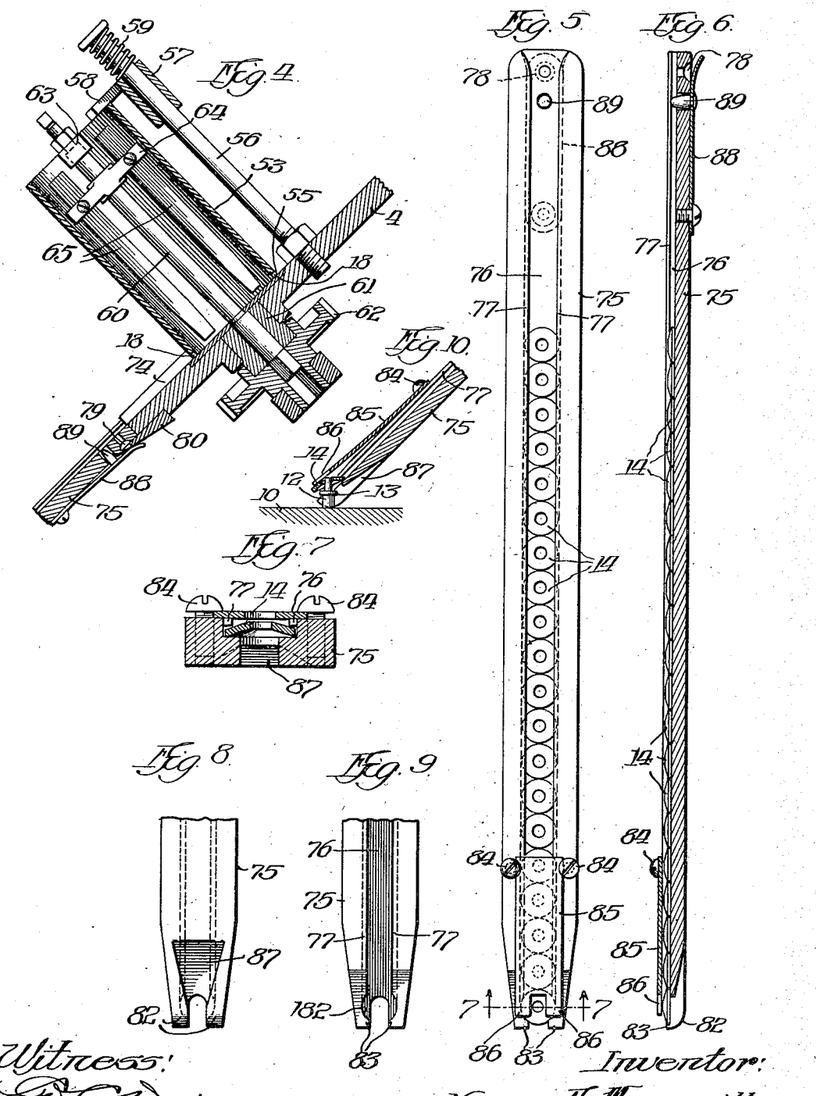
Fig. 4 is a vertical section through the washer receiving and distributing hopper.
Fig. 5 is a plan view of the washer guide or chute.
Fig. 6 is a longitudinal section through the center of the chute.
Fig. 7 is a section on the line 7—7 of Fig. 5.
Fig. 8 is a view of the lower end of the chute looking at the bottom thereof.
Fig. 9 is a view similar to Fig. 8 looking at the top of the chute.
Fig. 10 is a detail showing the manner in which the washer passes on the pin.

A single hopper is shown in detail in Fig. 4 and comprises a removable metallic cylinder secured to a plate 55 seated in a supporting member 4 or 54. The lower edge of the cylinder is provided with apertures 18 through which the washers may pass, concave face down only. Slightly above the hopper a pin 56 is secured in the supporting plate, the upper end of the pin carrying a slidable keeper 57, the fingers 58 of which project over the upper edge of the hopper and hold it in position, being pressed downwardly by a spring 59.

An agitator shaft 60 is located centrally of the hopper, the lower end being received in a bearing 61 secured in the supporting plate and carrying a gear 62 by which it may be rotated. The upper end of the shaft is received in and steadied by a bar 63 secured across the top of the hopper. Near the upper end of the shaft 60 is secured a cross arm 64 from which is suspended a pair of stirring arms 65, of spring steel, or other resilient material, which reach nearly to the bottom of the hopper and agitate the washers so that they will pass out of the holes 18 by gravity.

The gears are intermeshed across each row of hoppers, the first gear of each set meshing with a drive pinion 66 carried on the upper end of shaft 67 supported on one of the supporting members. The lower end of the shaft 67 carries a bevel pinion 68 which meshes with a similar bevel pinion 68' on a stub shaft 69. The shaft 69 of the first row of hoppers carries a sprocket 70 which is driven by a chain 72 from a sprocket 71 on the end of the shaft 29. The agitators for the additional hoppers are driven by sprocket connections shown in dotted outline in Fig. 1 and indicated generally by the numeral 73.

On the lower edge of each hopper supporting plate is arranged a series of guides or conveyors, one for each hopper, which guide the washers as they pass into the chutes. The details of this device are described in my copending application above identified. One only of the set of guides is shown in Fig. 2, being the set for the first row of hoppers. Each guide comprises a converging channel 74 which leads to a separate chute or washer holder 75, which is in effect a gravity conveyor for the washers. It will be noted that the walls of the guideway converge at such an angle that there is little danger of the washers piling up at the point where they enter the chutes.

The chutes 75 comprise a main body portion formed with a chanel 76 of a width slightly greater than the diameter of the washers, over which project two flanges 77 which hold the washers in the channel. The upper end of the chute or guideway is provided with a recess 78 which is arranged to fit over a pin 79 on the lower edge of a plate 80 secured on the under side of the hopper supporting plate. By means of this pin and recess, a chute is removably and pivotally attached to the supporting plate at the mouth of each guideway 74. Each chute is arranged to align with a row of washer supporting pins in a mold. A possible arrangement of the several chutes is shown in Fig. 3 of the drawings, projections of the chutes on the mold being shown in dot and dash lines. The several chutes of a set, may, if desired, be kept spaced apart the required distance while allowing a certain play about the pins 79 by being adjustably secured to a cross bar 81 supported from the framework 5.

The lower end of each chute is rounded off at 82 and while the molds are being filled, rests on the upper surface of the mold plate 10 at about the angle shown in Fig. 1. The lower end of the chute is cut out on its upper side as at 182, to allow a washer to pass out at this point, the lower end of the channel being closed by two fingers 83 which prevent the washers passing out except through the aperture 182. Above the lower end of the chute is secured by means of screws 84 a spring plate 85, the lower end of which is provided with a pair of fingers 86 which hold the lowermost washer in place and permit the washer supporting pin to enter the hole of the washer.

As the molds 10 are passed under the machine, the pins enter the converging guideway or slot 87 and by it are guided into the holes in the washers. The lower end of the spring plate will rise slightly allowing the washer to pass out on the pin. The fingers 86 passing over the top of the washer press it down into position on the shoulder 13. The action at the escapement end of the chute is clearly shown in Fig. 10.

It is possible to remove the chute from the machine and, holding it in the hand, draw it over pins in the mold. For this reason, I have made a separate application on the chute per se, which is identified at the opening of the specification. At the upper end of the chute there is secured a light spring metal plate 88, near the end of which projects a pin 89, which, when the guide is removed for use as a hand tool, projects into the channel for the washers preventing their accidental removal. When the chute is in position to be filled, the free end of the plate is forced under the plate withdrawing the pin to permit the washers to drop into the chute. The spring plate also assists in holding the chute in place on the pin 79.

Operation.

As the washers are received, such as require deburring or sizing, are placed in the bin or hopper 16 from whence they pass into the grinding wheel 33 and fall through the opening 50 into the pan 51. From this receptacle they are placed in the several distributing hoppers 53 which feed the several chutes 75. The chutes being adjusted to align with the several rows of pins, the mold plates are placed on the trucks and passed through the machine. As the pins pass through the guideway 87, the washers drop over the pins and are located on the shoulders.

The particular forms of chutes and hoppers are not essential and may be varied in a number of details. The apparatus may be used simply as a washer handling and chute filling machine, with or without the grinding and sizing device, the traveling mold carriers being omitted and the chutes used as hand tools.

I consider myself the first to construct a practical device for placing washers in rubber heel molds, replacing the tedious and expensive operation of placing washers by hand. I am, therefore, entitled to broad equivalents within the scope of my invention as defined in the appended claims.

I claim:

1. In an apparatus for placing washers in molds, the combination of a washer holder, and mold plate conveying means over which the plates are movable to receive washers from said holder.

2. In an apparatus for placing washers in molds the combination of a washer holder, a mold plate supporting and conveying means over which the plates are movable, and means on said holder to present the washers to the pins on which they are supported.

3. In an apparatus for placing washers in molds the combination of a washer holder, a mold plate support, and means for causing relative movement of said holder and said support.

4. In an apparatus for placing washers in molds the combination of a washer holder, a mold plate support, and means for causing relative movement of said holder and said support to present the washers to the pins on which they are supported.

5. An apparatus for placing washers on mold pins, comprising a washer chute, means at the lower end of said chute permitting the release of said washers, and means to cause said mold pins to pass across the lower end of said chute.

6. An apparatus for placing washers on mold pins, comprising a washer chute, means at the lower end of said chute to hold a washer, an escapement device permitting the washer to be removed from the end of the chute, and means to cause said mold pins to pass across the lower end of said chute.

7. An apparatus for placing washers on mold pins, comprising a pivoted washer chute, means at the lower end of said chute permitting the release of said washers, means to cause said mold pins to pass across the lower end of said chute, and a guiding formation on the lower end of the chute to direct the pin into the washer.

8. An apparatus for placing washers on mold pins, comprising a pivoted washer chute, means at the lower end of said chute to hold a washer, an escapement device permitting the washer to be removed from the end of the chute, means to cause said mold pins to pass across the lower end of said chute, and a guiding formation on the lower end of the chute to direct the pin into the washer.

9. An apparatus for placing washers on mold pins, comprising an element for supporting a column of washers with the hole in the lowermost washer exposed, means for guiding the pin into the hole in the washer, and releasing means for permitting the lowermost washer to be removed from the end of the column, a mold support and means for causing relative travel between the mold and the washer supporting element.

10. An apparatus for placing washers on mold pins, comprising an element for supporting a washer, means for supporting a mold and causing relative travel between it and the washer supporting element, and means for guiding the pin into the washer.

11. An apparatus for placing washers on mold pins, comprising an element for supporting a washer, a mold conveyor, and means to guide the pin into the washer.

12. An apparatus for placing washers on mold pins, comprising a washer holding chute, a mold conveyor, means to guide the pin into the washer, and an escapement device at the lower end of the chute permitting the washer to pass out of the chute when it has become seated on the pin.

13. An apparatus for placing washers on mold pins comprising a freely movable washer holding chute, a mold conveyor, means to guide the pins into the washer, and an escapement device at the lower end of the chute.

14. An apparatus for placing washers on mold pins, comprising a freely movable washer supporting element, a mold conveyor, and means to guide the pin into the hole in the washer.

15. In a device of the character described, the combination of a freely movable washer chute, and means for filling said chute.

16. In an apparatus of the character set forth, the combination of a washer chute, means for filling said chute, and mold conveyor to pass a mold across the lower end of said chute.

17. In an apparatus of the character set forth, the combination of a washer chute, and means for filling said chute, said means including a device facing all of the washers in one direction.

18. In an apparatus of the character set forth, the combination of a washer chute, and means for filling said chute, said means including a device facing all of the washers in one direction, and a mold conveyor to pass a mold across the lower end of said chute.

19. In an apparatus of the character described, the combination of a freely movable gravity conveyor for washers, a detent and escapement device at the lower end of said conveyor, and means for supplying said conveyor with washers.

20. In an apparatus of the character described, the combination of a gravity conveyor for washers, a detent and escapement device at the lower end of said conveyor, means for supplying said conveyor with washers, including a device for facing all of said washers in one direction.

21. In an apparatus of the character described, the combination of a gravity conveyor for washers, a detent and escapment device at the lower end of said conveyor, means for supplying said conveyor with washers, and a mold conveyor adjacent the discharge end of said washer conveyor.

22. In an apparatus of the character described, the combination of a gravity conveyor for washers, a detent and escapment device at the lower end of said conveyor, means for supplying said conveyor with washers including a device for facing all of said washers in one direction, and a mold conveyor adjacent the discharged end of said washer conveyor.

23. An apparatus for handling washers of concavo-convex or similar shape, comprising a hopper, and means permitting discharge of washers from said hopper, only when faced in one direction.

24. An apparatus for handling washers of concavo-convex or similar shape, comprising a hopper, means permitting discharge of washers from said hopper, only when faced in one direction, and means for conveying said washers to a mold plate.

25. An apparatus for handling washers, comprising a hopper, a discharge aperture, the shape of said aperture permitting said washers to pass out when faced in one direction only, and means for receiving said washers.

26. An apparatus for handling washers, comprising a hopper, discharged apertures in said hopper, the shape of said apertures permitting said washer to pass out of the hopper when faced in one direction only, and a gravity conveyor fed from said hopper.

27. An apparatus for handling washers, comprising a hopper, means for agitating the washers in said hopper, means permitting the discharge of washers from said hopper when faced in one direction only, and a washer holder receiving the washers from said hopper.

28. An apparatus for handling washers, comprising a hopper, means for agitating the washers in said hopper, and a freely movable washer holder and conveyor receiving said washers from the hopper and conveying them to the point where they are placed on the mold.

29. An apparatus for handling washers, comprising a hopper, means for agitating the washers in said hopper, a washer holder and conveyor receiving said washers from the hopper and conveying them to the point where they are placed on the mold, and means for insuring the facing of the washers in one direction in the holder.

30. In an apparatus for handling washers, a gravity conveyor for said washers, and means for supplying said conveyor with washers faced in one direction only.

31. In an apparatus for handing washers, a holder and conveyor for said washers, means for supplying said conveyor with washers concave side down, and means for placing the washer on a mold pin in the same position.

32. In an apparatus for handling washers, a conveyor for washers, means for supplying said conveyor with washers concave side down, an escapement device at the lower end of said conveyor, and means for directing the mold pins so that they center with the exposed washer at the lower end of the conveyor.

33. In an apparatus for placing washers in rubber heel molds, a plurality of pivotally mounted washer chutes, means for supplying said chutes with washers, and a mold carrier below said chute.

34. In an apparatus for placing washers in rubber heel molds, a plurality of pivotally mounted washer chutes, means for supplying said chutes with washers, a mold carrier below said chutes, and guiding means to register the lower ends of said chute with the mold pins.

35. In an apparatus for placing washers in rubber heel molds, a plurality of pivotally mounted washer chutes, means for supplying said chutes with washers, a mold carrier below said chute, and an escapement device at the lower end of said chute.

36. In an apparatus for placing washers in rubber heel molds, a plurality of pivotally mounted washer chutes, means for supplying said chutes with washers, a mold carrier below said chutes, guiding means to register the lower ends of said chutes with the mold pins, and an escapement device at the lowest end of said chute.

37. In an apparatus of the character described, a pair of complementary grinding members, and means for conducting washers between the members.

38. In an apparatus of the character described, a pair of complementary grinding members, a groove on each member into which the edge of the washer is received, and means for rotating one of said members.

39. In an apparatus of the character described, a rotary disk, provided with a groove in its edge, a stationary shoe provided with a complementary groove, and means for conducting washers into said grooves.

40. In an apparatus of the character described, a rotary disk, a stationary shoe, means for conducting washers between the disk and the shoe, and grinding surfaces on the complementary faces of said elements.

41. In an apparatus of the character described, a washer carrier, a stationary deburring shoe, and means for moving said carrier to grind the washer between the carrier and the shoe.

42. In an apparatus of the character described, a movable washer carrying disk, a groove in the edge of said disk, means for conducting washers into said groove, and a complementary deburring element into which the edge of the washer is passed by the carrying disk.

43. In an apparatus of the character described, a washer carrying disk, provided with a washer holding formation which holds the edge of the washer, and a grinding element into which the washer is carried.

44. In an apparatus of the character described, a rotary disk provided with means for holding the washer by the edge, and a stationary shoe, provided with a groove into which the edge of the washer is carried by said disk.

45. A washer handling apparatus comprising a deburring mechanism, distributing hoppers and washer conveyors.

46. A washer handling apparatus comprising a deburring mechanism, distributing hoppers and washer conveyors and escapement mechanism located thereon, and a mold carrier beneath the conveyors.

47. A washer handling apparatus comprising a deburring mechanism, a hopper, a washer holder and conveyor supported from said hopper, and a mold carrier beneath the conveyor.

48. A washer handling apparatus comprising a deburring mechanism, a washer holder and conveyor, and a mold carrier beneath the conveyor.

49. A washer handling apparatus comprising a deburring and sizing mechanism, a washer conveyor, an escapement device at the lower end of said conveyor, and a mold carrier beneath the conveyor.

50. A device for feeding washers, comprising a reservoir, a discharge nozzle, and a channel member having a guide-way affording communication between said reservoir and said discharge nozzle, undercut side ways in said channel member, and said nozzle having a recess disposed between said undercut side ways and a depression merging into said recess.

51. A device for feeding washers comprising a reservoir, and a discharge nozzle in communication with said reservoir and having undercut side ways and a recess disposed between said undercut side ways.

52. In an apparatus for placing washers in rubber heel molds, a plurality of washer chutes, and means for supplying said chutes with washers.

53. In an apparatus for placing washers in rubber heel molds, a plurality of washer chutes, means for supplying said chutes with washers, and an escapement device at the lower end of said chutes.

54. In an apparatus for placing washers in rubber heel molds, a plurality of washer chutes, means for supplying said chutes with washers, guiding means to register the lower ends of said chutes with the mold pins, and an escapement device at the lower ends of said chutes.

55. A machine for placing washers in rubber heel molds, comprising a receptacle for holding a supply of washers, means for discharging washers from said receptacle, a chute receiving the washers from the receptacle, the lower end of the chute being mounted so as to be in communication with a mold pin and means operable to release a washer from the chute and deposit it on the mold pin.

56. A machine for placing washers on mold pins comprising a receptacle for holding a supply of loose washers, means for discharging the washers from said receptacle, a conveying device for conducting the washers from the receptacle, said conveying device being mounted so as to deliver a washer and deposit it on the mold pin.

57. A machine for placing washers on mold pins comprising a receptacle for holding a supply of loose washers, means for discharging the washers from said receptacle so that the washers lie in a common plane, a conveying device for conducting the washers from said receptacle, said conveying device being mounted so as to deliver a washer and deposit it on the mold pin.

HARVEY F. MARANVILLE.